US008045010B2

(12) United States Patent  (10) Patent No.: US 8,045,010 B2
Yoshida  (45) Date of Patent: Oct. 25, 2011

(54) IMAGING APPARATUS, IMAGING PICKUP UNIT CONNECTABLE TO A LENS UNIT, AND A LENS UNIT CONNECTABLE TO IMAGING PICKUP UNIT

(75) Inventor: Akihiro Yoshida, Yokohama (JP)

(73) Assignee: Ricoh Company, Ltd, Tokyo (JP)

( * ) Notice: Subject to any disclaimer, the term of this patent is extended or adjusted under 35 U.S.C. 154(b) by 489 days.

(21) Appl. No.: 11/869,471

(22) Filed: Oct. 9, 2007

(65) Prior Publication Data

US 2008/0084487 A1  Apr. 10, 2008

(30) Foreign Application Priority Data

Oct. 10, 2006 (JP) ................................. 2006-276301

(51) Int. Cl.
H04N 5/232 (2006.01)
H04N 5/225 (2006.01)
(52) U.S. Cl. .................... 348/211.14; 348/372
(58) Field of Classification Search ............ 348/211.14, 348/372
See application file for complete search history.

(56) References Cited

U.S. PATENT DOCUMENTS

| | | | | | |
|---|---|---|---|---|---|
| 4,868,646 | A | * | 9/1989 | Tsuji | 348/76 |
| 5,079,716 | A | * | 1/1992 | Lenhardt et al. | 320/153 |
| 6,313,868 | B1 | * | 11/2001 | D'Alfonso et al. | 348/72 |
| 6,982,750 | B1 | | 1/2006 | Yoshida et al. | |
| 7,042,499 | B1 | * | 5/2006 | Kido et al. | 348/211.14 |
| 7,180,543 | B2 | | 2/2007 | Ojima et al. | |
| 7,187,409 | B2 | | 3/2007 | Nakahira et al. | |
| 2003/0223009 | A1 | | 12/2003 | Yoshida et al. | |
| 2004/0169766 | A1 | | 9/2004 | Yoshida | |
| 2006/0061677 | A1 | | 3/2006 | Yoshida | |
| 2007/0030369 | A1 | | 2/2007 | Ojima et al. | |
| 2007/0212055 | A1 | | 9/2007 | Yoshida | |

FOREIGN PATENT DOCUMENTS

| | | |
|---|---|---|
| JP | 06-265991 | 9/1994 |
| JP | 08-110561 | 4/1996 |
| JP | 2000-75386 | 3/2000 |

(Continued)

OTHER PUBLICATIONS

Office Action issued Dec. 14, 2010, in Japanese Patent Application No. 2006-276301.

Japanese Office Action mailed on Aug. 9, 2011, issued for JP Application No. 2006-276301, filed Oct. 10, 2006.

Primary Examiner — Tuan Ho
Assistant Examiner — Mark Monk
(74) Attorney, Agent, or Firm — Oblon, Spivak, McClelland, Maier & Neustadt, L.L.P.

(57) ABSTRACT

An imaging apparatus including a lens unit and an image pickup unit. The lens unit includes an optical system that projects a subject image onto an imaging device, the imaging device that converts the subject image into an electric signal, an imaging device driving part that drives the imaging device, an signal processing device that converts the electric signal from the imaging device into a digital signal, and a first connection part that connects the lens unit to the imaging pickup unit mechanically and electrically. The imaging pickup unit includes an electric power supply part, a second connection part that connects the lens unit to the imaging pickup unit mechanically and electrically, voltage supply lines that supply output voltage to the lens unit, and a voltage generating circuit that generates the output voltage supplied to the voltage supply lines.

18 Claims, 8 Drawing Sheets

FOREIGN PATENT DOCUMENTS

| | | |
|---|---|---|
| JP | 2000-175089 | 6/2000 |
| JP | 2003-319232 | 11/2003 |
| JP | 2004-109708 | 4/2004 |
| JP | 2004-117380 | 4/2004 |
| JP | 2005-278022 | 10/2005 |
| JP | 2006-135588 | 5/2006 |

* cited by examiner

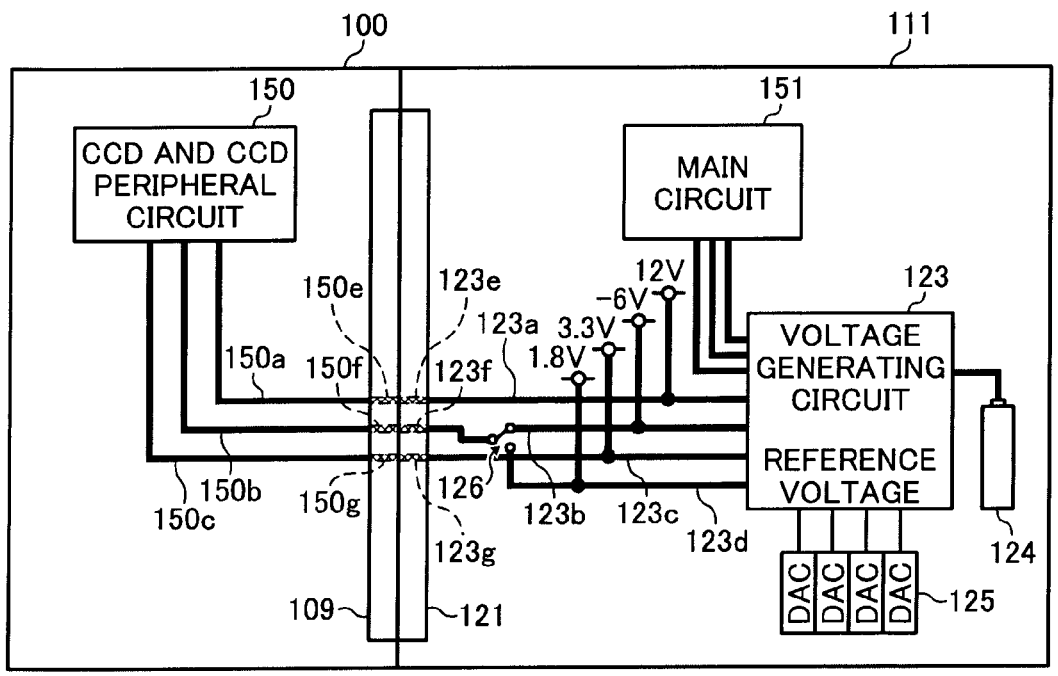
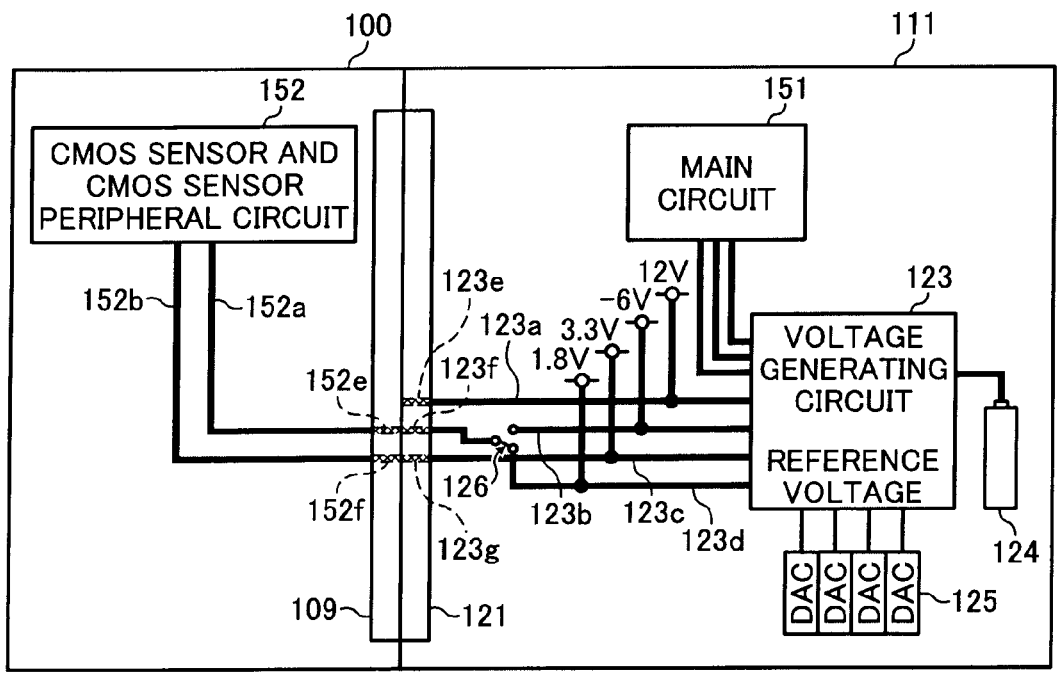

IMAGING APPARATUS, IMAGING PICKUP UNIT CONNECTABLE TO A LENS UNIT, AND A LENS UNIT CONNECTABLE TO IMAGING PICKUP UNIT

CROSS-REFERENCE TO RELATED APPLICATIONS

The present application claims the benefit of priority to Japanese Application No. JP 2006-276301, filed Oct. 10, 2006, the contents of which are incorporated herein by reference.

BACKGROUND OF THE INVENTION

1. Field of the Invention

The present invention relates to an imaging pickup apparatus and more particularly to an imaging pickup apparatus capable of replacing a lens unit.

2. Discussion of the Background

In Japanese Laid-Open Patent Application No. 2000-175089, a digital camera with interchangeable lenses as an imaging pickup apparatus including a lens unit and a camera body as an imaging pickup apparatus body is disclosed. The lens unit is configured by a nonvolatile storage and a connector, and the camera body is configured by a connector, a memory processing device, and a central processor.

In Japanese Laid-Open Patent Application No. 2006-135588, a camera system including an optical unit, an adaptor part and a camera body as a lens unit is disclosed. The adaptor has been configured by a mount, an imaging device, and an imaging processor.

In Japanese Laid-Open Patent Application No. 2003-319232, a digital imaging pickup apparatus including a camera body as an imaging pickup apparatus body being configured by an imaging storage and a main controller is disclosed. A lens system as a lens unit connecting to the camera body switchable including a lens, an image processor correcting an image is also disclosed.

The technology of imaging pickup devices is quickly developing. Therefore, an imaging pickup device designed a year ago may lose commercial value due to the advancement of the imaging device and the improving design of a lens.

SUMMARY OF THE INVENTION

The present inventors recognized that the above-noted background art suffers from low versatility of an imaging pickup device because the imaging pickup device cannot connect to multiple imaging devices.

Therefore, an object of the present invention is to provide a novel imaging pickup device, a novel imaging pickup device body, and a novel lens unit, that can all increase general versatility of the imaging pickup device.

Such an imaging pickup device, an imaging pickup device body, and a lens unit are applicable to a device that is equipped with a connection part to connect between an imaging pickup device and a lens unit.

To achieve the above and other objects, the present invention sets forth an imaging pickup unit, which includes an electric power supply part, a second connection part connecting the lens unit mechanically and electrically, voltage supply lines supplying output voltage to the lens unit, and a voltage generating circuit generating the output voltage supplied to the voltage supply lines, the lens unit, which includes an optical system that projects a subject image onto an imaging device, the imaging device converting the subject image into an electric signal, an imaging device driving part driving the imaging device, an signal processing device converting the electric signal from the imaging device into a digital signal, and a first connection part connecting a imaging pickup unit mechanically and electrically, and an imaging device including the imaging pickup unit and the lens unit.

BRIEF DESCRIPTION OF THE DRAWINGS

FIG. 2A is a block diagram showing a connection between an imaging pickup apparatus body and a lens unit including a CCD according to second embodiment of the present invention;

FIG. 2B is a block diagram showing a connection between an imaging pickup apparatus body and a lens unit including a CMOS sensor according to second embodiment of the present invention;

DETAILED DESCRIPTION OF THE PREFERRED EMBODIMENTS

Embodiments of the present invention are described below with reference to the figures.

The present invention can be used with many different types of lens units, e.g., wide-angle lens type, zoom lens type, large size imaging pickup device type, high-sensitive imaging pickup device type, and wide dynamic range type.

Figure 1A:
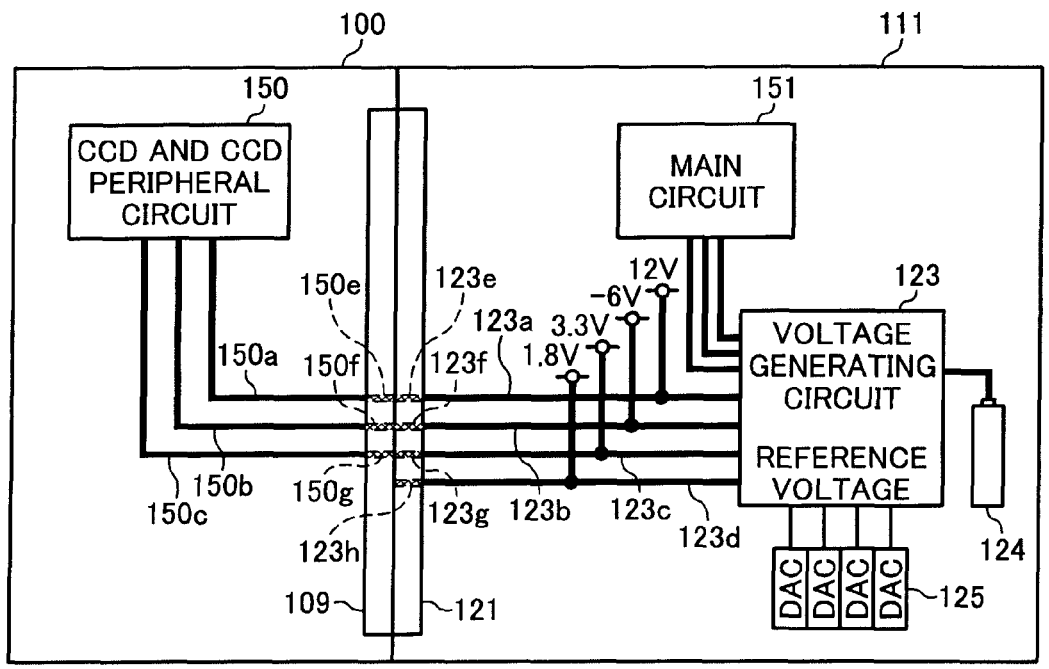
FIG. 1A is a block diagram showing a connection between an imaging pickup apparatus body (imaging pickup unit) and a lens unit including a CCD according to first embodiment of the present invention.
Figure 1B:
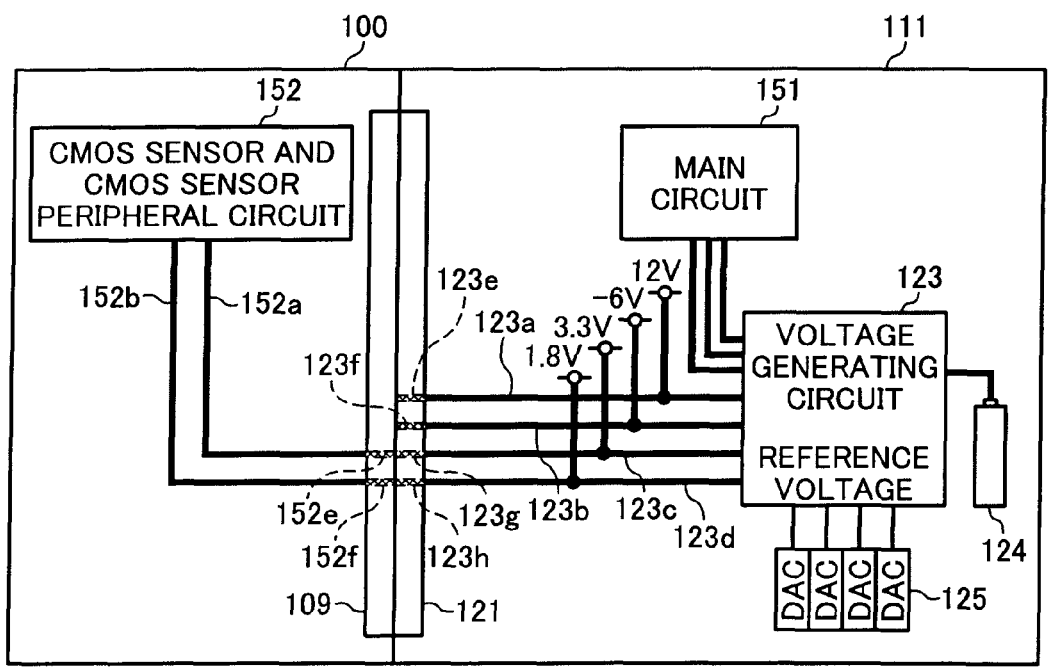
FIG. 1B is a block diagram showing a connection between an imaging pickup apparatus body and a lens unit including a CMOS sensor according to first embodiment of the present invention.

FIG. 1A and FIG. 1B schematically show a lens unit 100 and an imaging pickup apparatus body 111 according to one embodiment of the present invention.

FIG. 1A schematically shows the lens unit 100 including a CCD peripheral circuit and a CCD 150 as an imaging device converting a subject image obtained through an optical system (not shown) into an electric signal. The CCD peripheral circuit includes an imaging device driving part driving the CCD, and a signal processing device converting an analog signal input from the imaging device into a digital signal.

FIG. 1B schematically shows the lens unit 100 including a CMOS sensor peripheral circuit and a CMOS sensor 152 as an imaging device. The lens unit 100 includes an optical system (not shown).

The CCD and CCD peripheral circuit includes an imaging pickup circuit including a CCD converting a subject image obtained through the optical system into an electric signal, an imaging device driving signal generator driving the CCD, an oscillator and an analog-to-digital converter. The CMOS and CMOS peripheral circuit includes an imaging pickup circuit including the CMOS sensor, analog device, and digital device.

The main imaging pickup apparatus body 111 includes a main circuit 151, a voltage generating circuit 123, a battery 124 as an electric power supply, and a digital-to-analog converter (DAC) 125. The imaging pickup device 111 and the lens unit 100 are connected by a number of voltage supply lines. The lens unit 100 including the CCD and the CCD peripheral circuit includes voltage supply line 150a, 150b, and 150c. The lens unit 100 including the CMOS sensor and the CMOS sensor peripheral circuit 152 includes voltage supply lines 152a and 152b. The main imaging pickup apparatus body 111 includes voltage supply lines 123a, 123b, 123c, and 123d.

The voltage supply lines 150a, 150b, and 150c supply a power supply voltage through the imaging pickup circuit including the CCD and the CCD peripheral circuit 150.

The lens unit 100 includes a connection part 109 and the main imaging pickup apparatus body 111 includes a connection part 121. The connection part 121 includes end terminals 123e, 123f, 123g, and 123h.

The connection part 109 includes end terminals 150e, 150f, and 150g. The lens unit 100 including the CMOS sensor and the CMOS sensor peripheral circuit 152 includes end terminals 152e and 152f.

The connection part 109 is fitted into the connection part 121. Each end terminal of the lens unit 100 and the imaging pickup apparatus body 111 is connected electrically. The connection part 109 and 121 include also end terminals for connecting a signal line (not shown).

The voltage generating circuit 123 generates a variety of voltages supplied to the main circuit, an output voltage supplied to the CCD and the CCD peripheral circuit 150 and to the CMOS sensor and CMOS sensor peripheral circuit 152.

The voltage generating circuit 123, for example, generates four power supply voltages as an output voltage since the voltage generating circuit 123 can supply the voltage to both the CCD and the CMOS sensor.

The values of four power supply voltages are, for example, 12V, −6V, 3.3V, and 1.8V in one embodiment. A reference voltage can change the four values and, for example, voltages supplied by four DACs 125 can change the four values. Therefore each imaging device having different specification of a power supply voltage can be combined.

Here, power supply voltage is explained with an example based on a commonly used specification of CCD and CMOS sensor currently on the market. However, the values of power supply voltages are not limited to the above values.

An imaging device and an imaging device peripheral circuit generally need several electric power supply voltages. For example, a CCD need at least three electric power supply voltages, a high voltage in the range 10 to 16V, a negative voltage in the range −5 to −9V, and a voltage in the range 3 to 3.3V, because of reading out electric charges from a photodiode and making electric charge transfers.

For example, a CMOS sensor needs at least two electric power supply voltages, a voltage for digital device in the range 3 to 3.3V and a voltage approximately 1.8V for analog device. Each voltage of the electric power supply system is different depending on a model number of imaging devices.

Saving power is required by the market of imaging pickup apparatus and the voltage is decreasing with advancement in technology of an imaging device. Therefore, if the value of output voltages generated from the voltage generating circuit on the imaging pickup apparatus body 111 corresponding to each imaging device, a general versatility of the imaging pickup apparatus body is improved more than ever and the imaging pickup apparatus body increases the kinds of imaging devices connectable to the imaging pickup apparatus body.

FIG. 2A and FIG. 2B schematically show a lens unit and an imaging pickup apparatus according to the second embodiment of the present invention.

The second embodiment shows the voltage supply line 123b used in the case of lens unit 100 including the CCD and the CCD peripheral circuit 150, and the voltage supply line 123d used in the case of lens unit 100 including the CMOS sensor and CMOS sensor peripheral circuit 152, share an end terminal 123f of the connection part 121. A switching circuit 126 switches between the voltage supply line 123b and the voltage supply line 123d. The other configuration of the second embodiment is the same as the first embodiment. Therefore the detailed description of the other configuration is left out.

The voltage supply line 123a and the voltage supply line 123d may share an end terminal 123e of the connection part 121 by switching between the voltage supply line 123a and the voltage supply line 123d.

The first embodiment includes a voltage supply line for each voltage value. Thus, the number of end terminals is larger compared to a conventional apparatus. Accordingly, there is a potential disadvantage that the imaging pickup unit will become larger. Alternatively, if the problem of the increased number of end terminals is solved by reducing the size of the end terminals without increasing the size of the imaging pickup unit, there is a potential concern that a frequency of deterioration attributed to a degradation of intensity of the end terminals might increase in the first embodiment. However, as described above, the second embodiment can reduce the number of end terminals connecting the main imaging pickup apparatus body 111 and the lens unit 100, and the second embodiment can reduce the size of the imaging pickup apparatus.

Figure 3A:
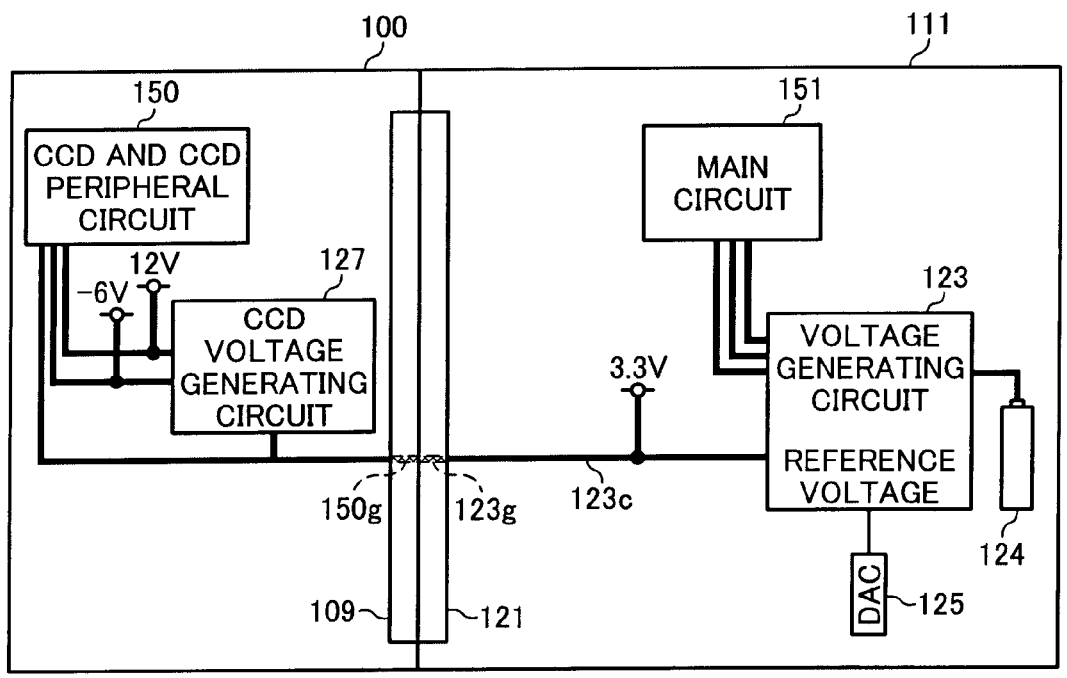
FIG. 3A is a block diagram showing a connection between an imaging pickup apparatus body and a lens unit including a CCD according to third embodiment of the present invention.
Figure 3B:
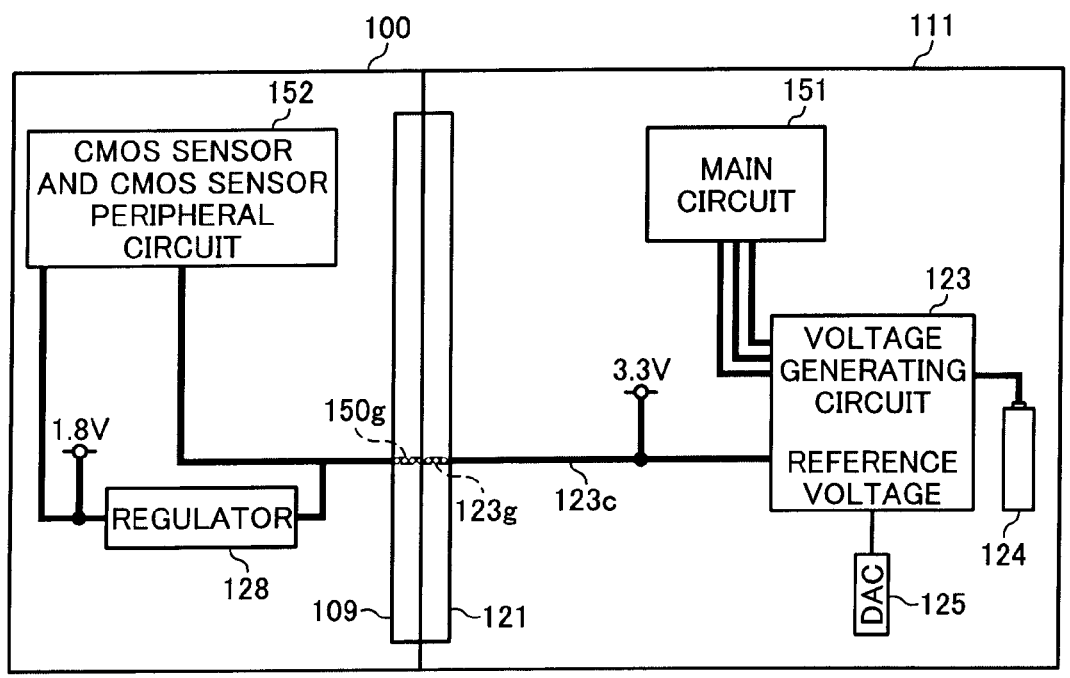
FIG. 3B is a block diagram showing a connection between an imaging pickup apparatus body and a lens unit including a CMOS sensor according to third embodiment of the present invention.

FIG. 3A and FIG. 3B schematically show a lens unit and imaging pickup apparatus body according to a third embodiment of the present invention.

In the third embodiment, the lens unit 100 including the CCD and the CCD peripheral circuit 150 includes a CCD voltage generating circuit 127 for imaging because in order to generate the voltage for imaging part in the lens unit 100, the main imaging pickup apparatus body 111 includes the main circuit 151, the voltage generating circuit 123, the one DAC 125, and the battery 124.

The lens unit 100 including the CMOS sensor and the CMOS sensor peripheral circuit 152 includes a regulator 128 as a voltage generating circuit for imaging. For example, the regulator 128 is constituted by a LDO (Low Drop Out) regulator as a voltage depression circuit for imaging, which depresses a voltage supplied to the imaging pickup circuit based on an output voltage supplied from the main imaging pickup apparatus body 111.

For example, the voltage generating circuit 123 supplies 3.3V to the lens unit 100 through the voltage supply lines 123c. For example, the CCD voltage generating circuit 127 is constituted by a charge pomp circuit. The CCD voltage generating circuit generates voltages, whose values are 12V and −6V. The regulator 128 generates a voltage whose value is 1.8V, in the case of the lens unit 100 including the CMOS sensor and the CMOS sensor peripheral circuit.

In addition, in the third embodiment, the DAC 125 is not necessarily required and it is not necessarily required to supply the voltage of 3.3V required of the CCD and the CMOS sensor from the imaging pickup apparatus body, either.

For example, in the case of the lens unit 100 including the CCD and the CCD peripheral circuit 150, the main imaging pickup apparatus body 111 may supply the voltage of 5V to the lens unit, the lens unit including the charge pomp circuit and the LDO regulator may generate the voltages of 3.3V, 12V and −6V. In the case of the lens unit 100 including the CCD and the CCD peripheral circuit 152, the main imaging pickup apparatus body 111 may supply the voltage of 5V to the lens unit, and the lens unit including the two kinds of LDO regulator may generate the voltages of 3.3V and 1.8V.

With the description above, the third embodiment can reduce end terminals connecting the main imaging pickup apparatus body 111 and the lens unit 100, and the third embodiment provides for increased versatility.

In addition, in the third embodiment, the output signal from the main imaging pickup apparatus body 111 is set to 3.3V. However, it is not limited to this. The imaging pickup apparatus body may supply a voltage of 3V to 3.3V to the lens unit 100, and the lens unit 100 may generate the voltages for imaging of 10V to 16V and −5V to −9V with the charge pomp circuit.

Figure 4A:
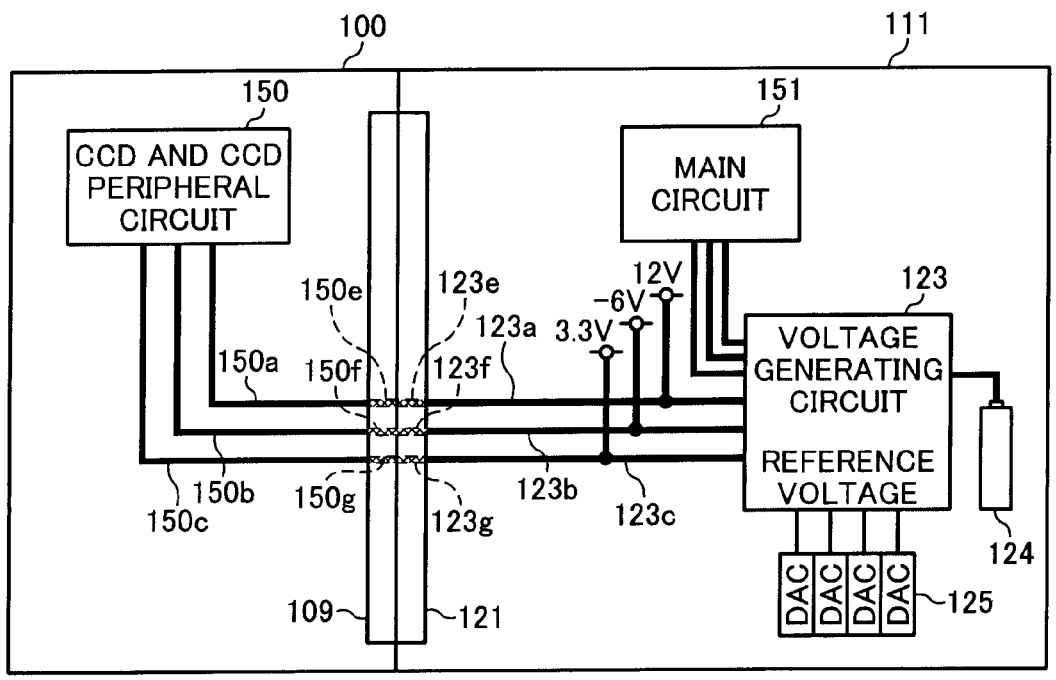
FIG. 4A is a block diagram showing a connection between an imaging pickup apparatus body and a lens unit including a CCD according to fourth embodiment of the present invention.
Figure 4B:
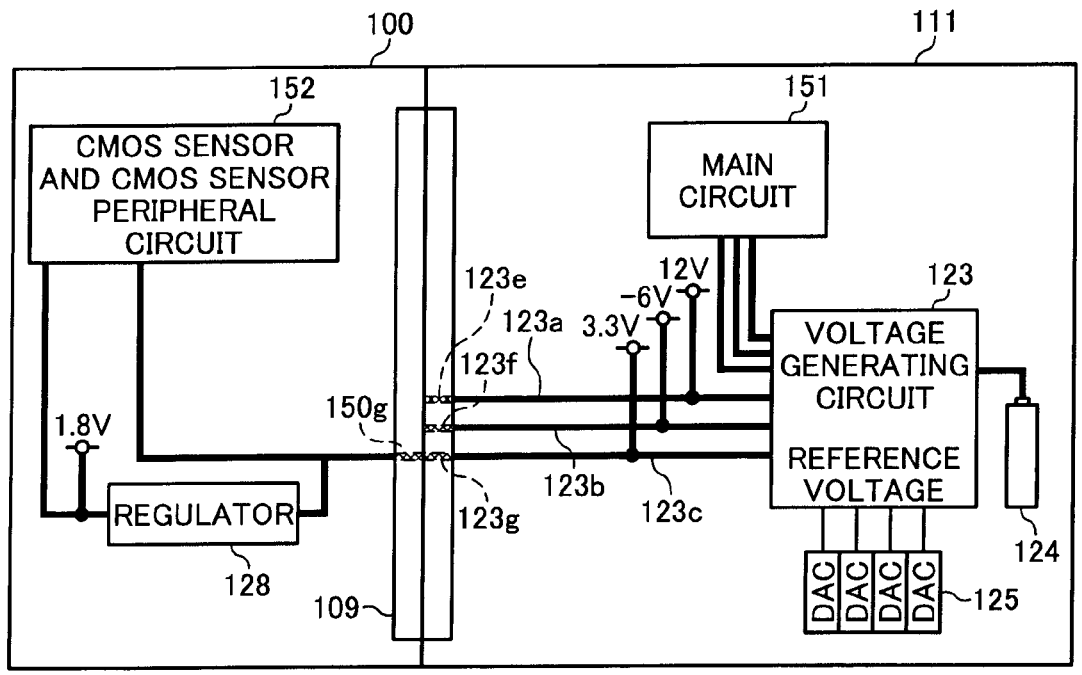
FIG. 4B is a block diagram showing a connection between an imaging pickup apparatus body and a lens unit including a CMOS sensor according to fourth embodiment of the present invention.

FIG. 4A and FIG. 4B schematically shows a lens unit and imaging pickup apparatus body according to a fourth embodiment of the present invention.

In the fourth embodiment, only the lens unit 100 including the CMOS sensor and the CMOS sensor peripheral circuit is described. The lens unit includes the voltage depression circuit for imaging, which depresses a voltage for imaging. The lens unit 100 includes an LDO regulator with a small circuit scale shown in FIG. 4B.

With the description above, the fourth embodiment can reduce the size of the imaging pickup apparatus body while avoiding making the lens unit 100 larger. In addition, the fourth embodiment can reduce end terminals connecting the main imaging pickup apparatus body 111 and the lens unit 100, and the fourth embodiment can increase versatility of the apparatus.

Figure 5:
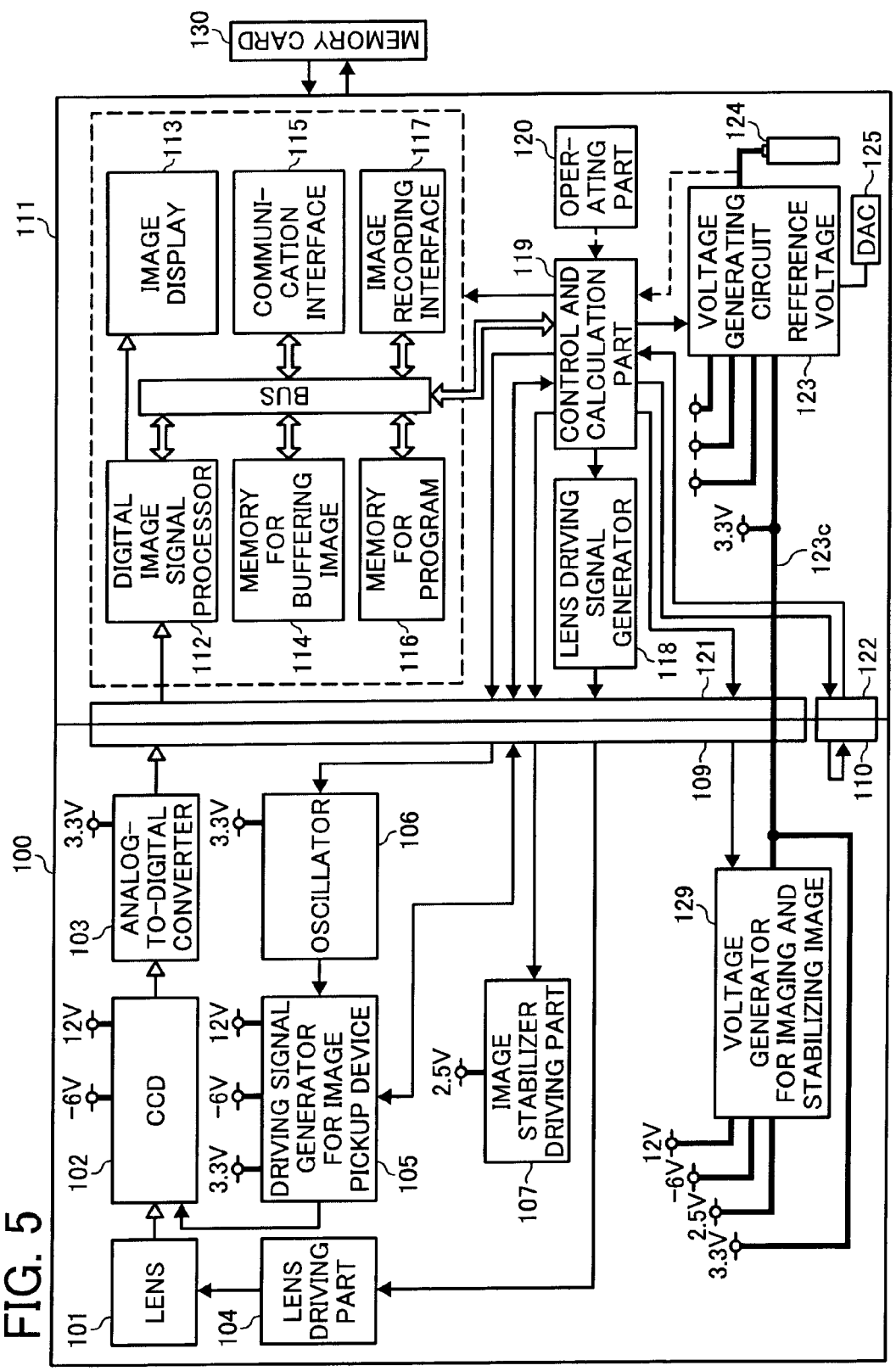
FIG. 5 is a block diagram showing details of the imaging pickup apparatus body and the lens unit shown in FIG. 3A.

FIG. 5 schematically shows a lens unit and imaging pickup apparatus body in detail according to a fifth embodiment of the present invention.

Here, the lens unit 100 includes the CCD as an imaging device and the CCD peripheral circuit.

In the fifth embodiment, the lens unit 100 includes imaging and image stabilizing voltage generation part 129 that generates the voltage for imaging and the voltage for image stabilizing.

The lens unit 100 and the imaging pickup apparatus body 111 are connected mechanically and electrically by the connection part 109 and 121. The connection part 109 includes a lock part 110. The connection part 121 includes a lock part 122. The connection parts 109 and 121 have a function that locks the lens unit 100 and the main imaging pickup apparatus body 111 mechanically and detect a locking status. In sum, the connection parts 109 and 121 detect a connecting status and detect a kind of the lens unit 100 electrically.

An electric power supply of the main imaging pickup apparatus body 111 is the battery 124. The voltage generating circuit 123 includes a DC-DC converter and generates sufficient power supply voltage for the imaging pickup apparatus body 111 and the power supply voltage for the lens unit 100.

An analog-to-digital converter mounted on a control and calculation part 119 monitors an output signal from the battery 124. A control process is operated by the above configuration. In the fifth embodiment, the imaging pickup apparatus body uses the output voltage from the voltage generating circuit 123 as a primary-side electric power supply. However, in the case of supplying the electric power supply from the battery directly, it is better for efficiency of the electric power supply.

An image stabilizing driving part 107 has many types, including a shifting movable object on which the imaging device is mounted, a polychlorinated biphenyl board equipped with the imaging device, and a flexible printed circuit board in X-Y plane equipped with the imaging device.

The image stabilizing voltage generation part 129 generates voltages of 12V, −6V, and 2.5V. An on-off timing of generating voltages of 12V, −6V, and 2.5V is determined by a circuit constant of the image stabilizing voltage generation part 129 and a control timing of the control and calculation part 119.

In the fifth embodiment, the imaging pickup apparatus body includes a lens driving signal generator 118. However, the lens unit 100 may include a lens driving signal generator 118. In this case, a voltage may be supplied independently and may be supplied by shared use with the imaging part including a CCD 102, an analog-to-digital converter 103, etc.

The fifth embodiment emphasizes downsizing the lens unit 100 and reducing end terminals connecting the main imaging pickup apparatus body 111 and the lens unit 100 by the connection part 109 and the connection part 121.

Therefore, a digital image signal processor 112 is mounted on the main imaging pickup apparatus body 111. The analog-to-digital converter 103 is mounted on the lens unit 100 to maintain image quality.

In sum, the threat that a outward noise superimposes an analog signal as an image signal output by the CCD 102 increases because a length of a long line supplying the analog signal increase.

In addition, the CMOS sensor is generally mounted on semiconductor device equipped with the analog-to-digital converter 103 and a drive signal generator for imaging device 105. Therefore it is suitable that the analog-to-digital converter 103 is mounted on the lens unit 100 because the lens unit 100 including the CCD and the lens unit 100 including the CMOS sensor is connected to same imaging pickup apparatus body 111.

In addition, the interface of LVDS has the effect of reducing the number of end terminals, eliminating the need for a parallel interface using 10 bits to 16 bits.

An oscillator 106 used as reference clock in mounted on the lens unit 100 in the fifth embodiment because of a countermeasure against electromagnetic compatibility and a reference clock frequency depending on each imaging device.

The lens unit 100 includes the control and calculation part 119, an image display 113, a memory for buffering an image 114, a communication interface 115, a memory for storing a program 116, an image recording interface 117, and an operating part 120.

The main imaging pickup apparatus body 111 has a spatial margin, rather than the lens unit 100 in the fifth embodiment.

The memory for buffering image 114 has a capacity to process quickly an image having a large number of pixels. The memory for program 116 stores information of the type of the lens unit 100 because of corresponding to each type of the lens unit 100. A memory card 130 mounted on the a communication interface 115 or the image recording interface 117 records the information into the memory for program 116.

With the description above, the fifth embodiment reduces the number of end terminals connecting the main imaging pickup apparatus body 111 and the lens unit 100, and improves the versatility of the device.

Figure 6:
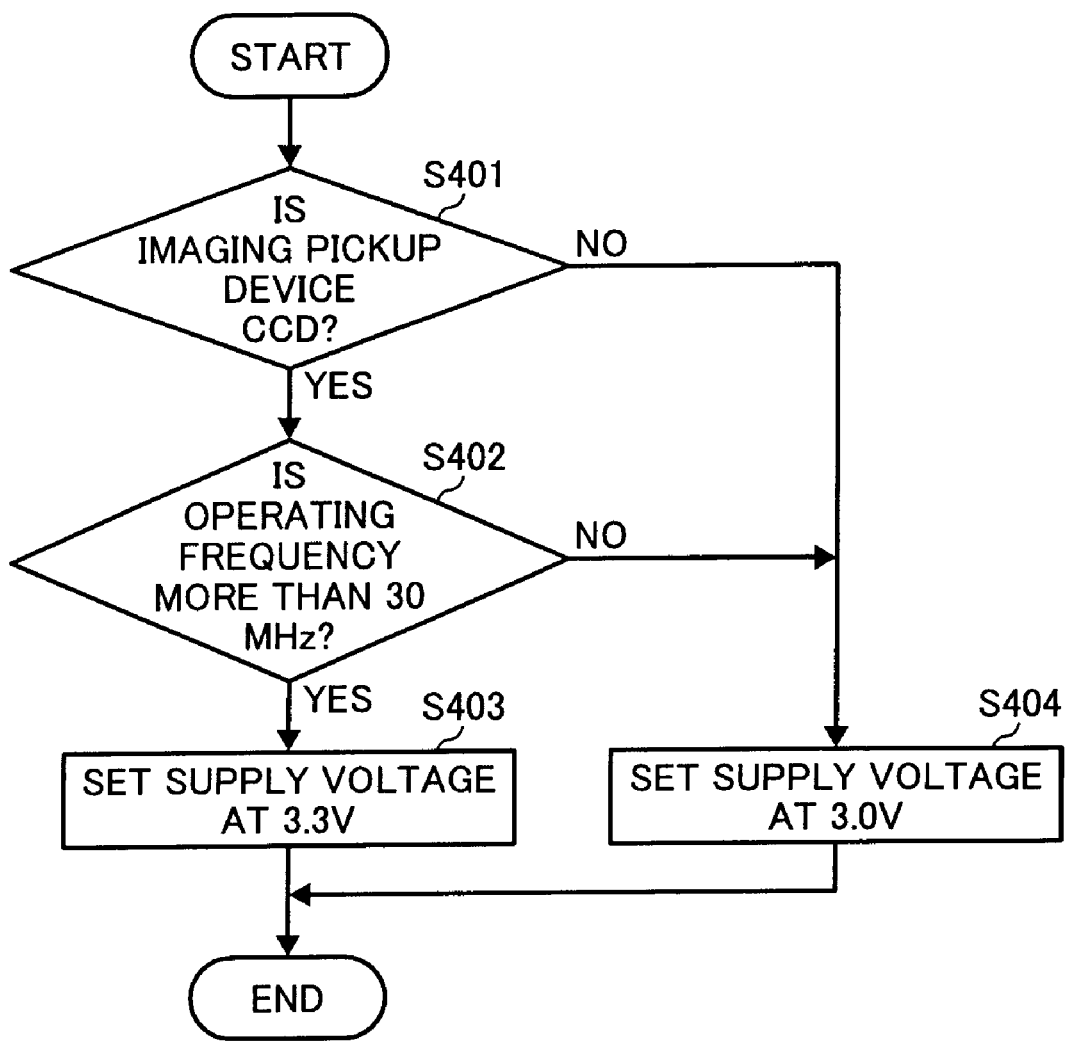
FIG. 6 is a flowchart showing a control process in the case of connecting the imaging pickup apparatus body and the lens unit shown in FIG. 5.

Next, a control flow of the lens unit 100 shown in FIG. 5 in the case of connecting to the main imaging pickup apparatus body 111 is described below with reference to FIG. 6 and FIG. 7. FIG. 6 shows switching a voltage supplying the lens unit 100 based on amount of driving frequency of the CCD.

The imaging pickup apparatus body is set to 3.3V on the electric power supply only when the lens unit 100 includes the CCD 102 and the driving frequency of the CCD 102 is high. Otherwise, the imaging pickup apparatus body set is to 3.0V on the electric power supply. Therefore, the main imaging pickup apparatus body 111 can maintain a horizontal transfer efficiency of the CCD 102 and save electric power.

In the first step S401, the main imaging pickup apparatus body 111 judges whether the imaging device is the CCD 102 by the lock part 110 and the lock part 122. The lock part 110 and the lock part 122 function as detectors detecting the type of the lens unit 100.

In the next step S402, the main imaging pickup apparatus body 111 judges whether the driving frequency of the CCD 102 is 30 MHz or above.

In the next step S403, the main imaging pickup apparatus body 111 sets the reference voltage by the DAC 125 so that the output voltage of the voltage generating circuit 123 is 3.3V when the driving frequency of the CCD 102 is 30 MHz or above.

In contrast, when the driving frequency of the CCD 102 is less than 30 MHz, in the next step S404, the main imaging pickup apparatus body 111 sets the reference voltage by the DAC 125 so that the output voltage of the voltage generating circuit 123 is 3.0V.

The supply voltage from 3.0V to 3.3V supplying the CCD depends on the load by horizontal transferring charges stored in the CCD. A CCD needs a voltage based on height of the driving frequency of a CCD and the number of pixels of a CCD. In contrast, a CMOS sensor doesn't need the circuit for horizontal transferring charges. Therefore, the main imaging pickup apparatus body 111 can save electric power by changing the voltage supplying the CCD 102 based on whether the lens unit includes the CCD or the CMOS sensor.

Figure 7:
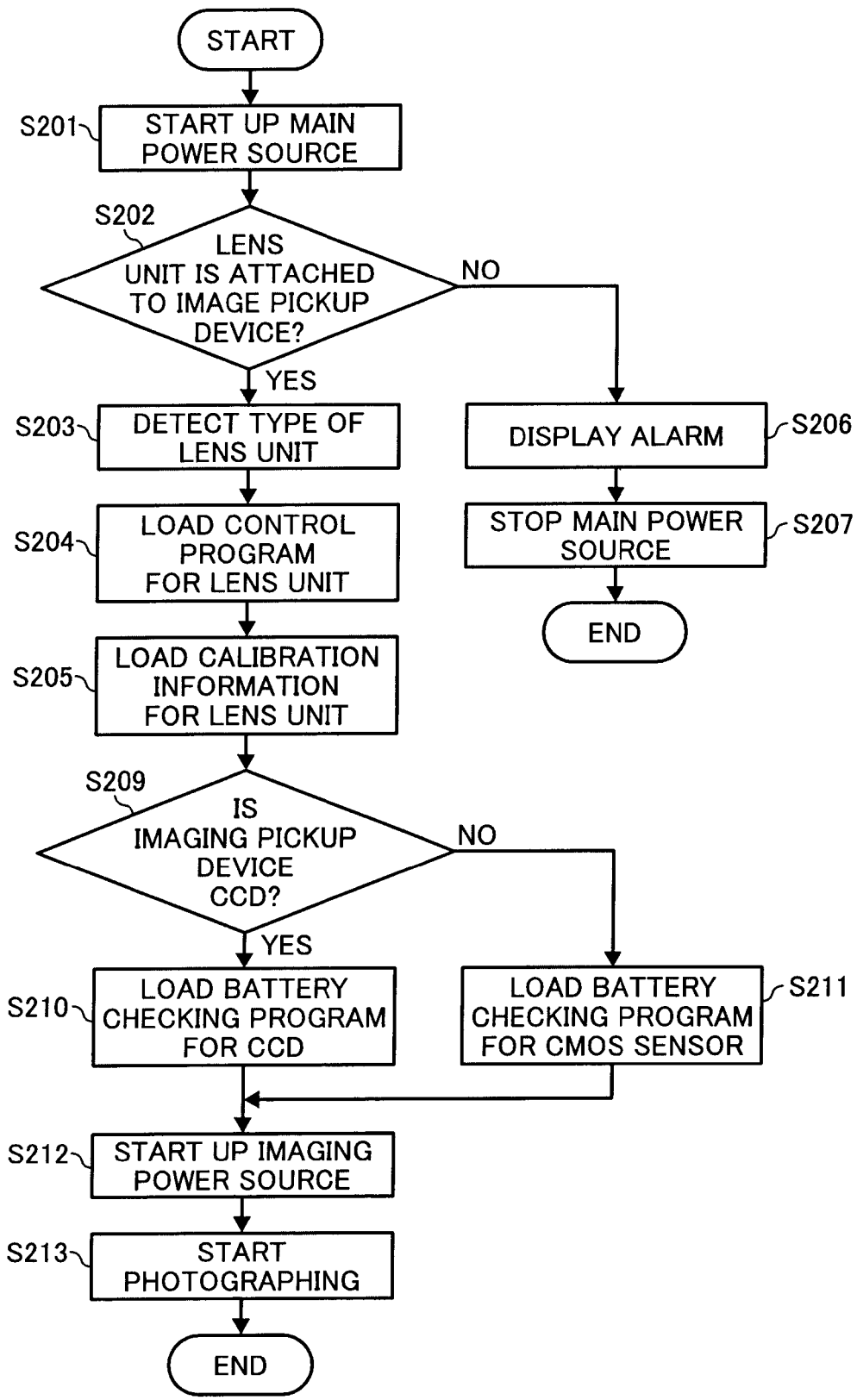
FIG. 7 is a flowchart showing a control process in the case of connecting and not connecting the imaging pickup apparatus body and the lens unit, and judging a kind of the lens unit mounted on the imaging pickup apparatus body.

FIG. 7 shows a process for judging whether the imaging pickup apparatus body 111 is equipped with the lens unit 100 or not, and judging the type of the lens unit 100.

In the first step S201, when an electric power supply button of the operating part 120 of the main imaging pickup apparatus body 111 is pressed, the control and calculation part 119 detects that the button is pressed and starts the electric power supply part of the main imaging pickup apparatus body 111.

In the first step S202, the control and calculation part 119 detects a locking status of the lock part 110 and the lock part 122 for judging whether the imaging pickup apparatus body 111 is equipped with the lens unit 100 or not.

In the next step S206, the main imaging pickup apparatus body 111 indicates that the imaging pickup apparatus body isn't equipped with the lens unit 100 now by displaying an alarm alerting a user when the control and calculation part 119 judges that the lock part 110 and the lock part 122 are unlocked, and the imaging pickup apparatus body isn't equipped with the lens unit 100 in the step S202.

In the next step S207, the control and calculation part 119 stops the electric power supply part of the main imaging pickup apparatus body 111.

Booting up the main imaging pickup apparatus body 111 is avoided by the process described above.

In the next step S203, the control and calculation part 119 identifies the type of the lens unit 100 based on the information detected by the lock part 110 and the lock part 122 when the control and calculation part 119 judges that the imaging pickup apparatus body is equipped with the lens unit 100 in the step S202.

In the next step S204, the control and calculation part 119 loads a lens unit control program from the memory for program 116 based on the information detected by the lock part 110 and the lock part 122. Here, the program loaded is, for example, an automatic exposure program, an automatic focus program, an automatic white balance program, an imaging sequence program, and a lens driving program.

In the next step S205, the control and calculation part 119 loads calibration information inherent in the lens unit 100 from the memory for program 116. Here, the information loaded is for calibrating inherent features of the lens unit 100. The information loaded is, for example, defect pixel information, sensitivity information, spectral sensitivity information, and information on the timing of a mechanical shutter.

In the next step S209, the control and calculation part 119 judges the type of the imaging device in the lens unit 100 based on the information detected by the lock part 110 and the lock part 122.

In the next step S210, the control and calculation part 119 loads a battery check program for high electric power consumption when the control and calculation part 119 judges that the imaging device is the CCD.

In the next step S211, the control and calculation part 119 loads a battery check program for low electric power consumption when the control and calculation part 119 judges that the imaging device is not the CCD.

In the next step S212, the control and calculation part 119 operates starting of the electric power supply part of the main imaging pickup apparatus body 111.

In the next step S213, the control and calculation part 119 lets the main imaging pickup apparatus body 111 start photographing.

The electric power consumption of the CCD and CCD peripheral circuit is three to five times as the electric power consumption of the CMOS sensor and CMOS sensor peripheral circuit.

It is advisable that a controlling process of the electric power supply is changed based on the difference of electric power consumption.

With the description above, the processes of indicating battery remaining amount on LCD, battery END control, and so on are changed by loading different battery programs.

Here, the battery END control is the control for stopping the electric power supply when the battery voltage is lower than the predetermined value. When the imaging pickup apparatus body is equipped with the lens unit including the CMOS sensor, the battery END control of the battery check program for the CMOS sensor can permit the imaging pickup apparatus body to be operated even if a battery remaining amount is less than the predetermined value for CCD.

Figure 8:
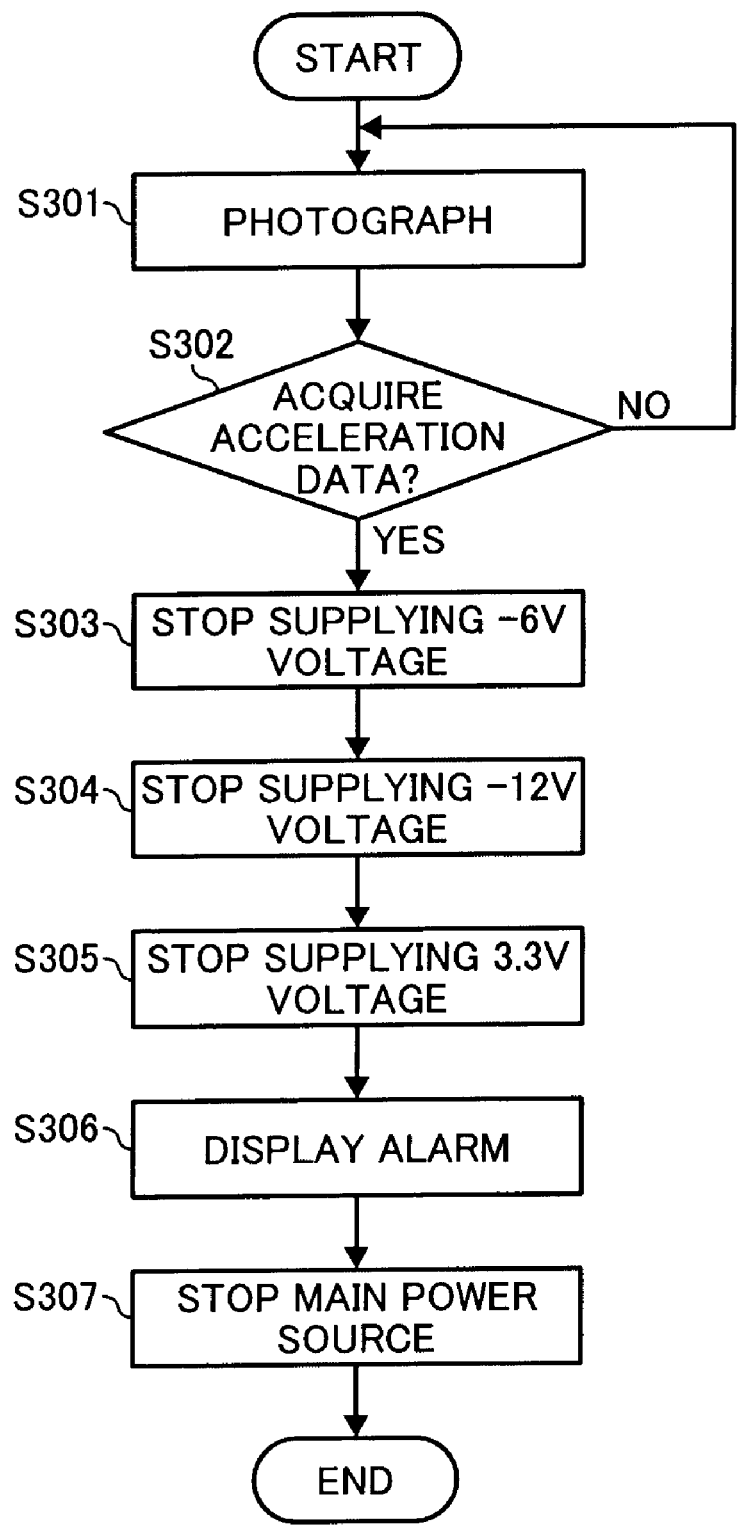
FIG. 8 is a flowchart showing a control process in the case of removing the lens unit from the imaging pickup apparatus body.

FIG. 8 is a flowchart of the process of disconnecting the lens unit 100 from the main imaging pickup apparatus body 111.

The control and calculation part 119 monitors the locking status of the lock part 110 and the lock part 122.

In the first step S301, the user photographs an object. At this point, the main imaging pickup apparatus body 111 and the lens unit 100 are connected.

In the next step S302, the control and calculation part 119 detects that the lock part 110 and the lock part 122 are unlocked, for example, when that user unlocks the main imaging pickup apparatus body 111 and the lens unit 100.

When lens unit 100 includes the CCD, for preventing the latch-up phenomenon (the phenomenon in which a circuit will not turn off until the source of current is lost completely once a circuit is turned on), in the step S303-S305, the control and calculation part 119 stops supplying the voltage in the order −6V, 12V, and 3.3V by controlling a voltage generating circuit 123.

In the next step S306, the control and calculation part 119 displays information indicating that the imaging pickup apparatus body is not equipped with the lens unit 100 now.

In the next step S307, the control and calculation part 119 stops supplying the voltage to each circuit in the main imaging pickup apparatus body 111.

With the description above, the process set forth above can prevent the main imaging pickup apparatus body 111 from breaking even if the user disconnect the lens unit 100 from the imaging pickup apparatus body 111 during operation.

In sum, when the power supply is turned on, it is necessary to turn on the high voltage power supply and the negative voltage supply for the CCD according to appropriate timing. In the of disconnecting the main imaging pickup apparatus body 111 and the lens unit 100 against the CCD feature above, the CCD may be broken by the latch-up phenomenon. However, the imaging device can be prevented from being broken because of controlling stopping voltage supply at the predetermined timing in response to an instruction from the imaging pickup apparatus body.

What is claimed is:

1. An imaging apparatus, comprising:
   (1) a lens unit including
      (a) an optical system configured to project a subject image onto an imaging device;
      (b) the imaging device configured to convert the subject image into an electric signal;
      (c) an imaging device driving part configured to drive the imaging device;
      (d) a signal processing device configured to convert the electric signal from the imaging device into a digital signal; and
      (e) a first connection part configured to connect the lens unit to or disconnect the lens unit from an imaging pickup unit mechanically and electrically; and
   (2) the imaging pickup unit, which is separate and distinct from the lens unit, the image pickup unit including
      (a) an electric power supply part;
      (b) a second connection part configured to connect the image pickup unit to or disconnect the image pickup unit from the lens unit mechanically and electrically;
      (c) a plurality of voltage supply lines configured to supply corresponding output voltages to the lens unit;
      (d) a plurality of digital-to-analog converters configured to supply a corresponding plurality of reference voltages to a voltage generating circuit, the reference voltages being modifiable to match power supply requirements of any of multiple imaging devices connectable to the imaging pickup unit; and
      (e) the voltage generating circuit configured to generate the corresponding output voltages supplied to the voltage supply lines based on the plurality of reference voltages.

2. The imaging apparatus according to claim 1, wherein the voltage generating circuit comprises:
   a switching circuit connecting between end terminals of the second connection part and a first line of the voltage supply lines by switching between the first line and another line of the voltage supply lines.

3. The imaging apparatus according to claim 1, wherein the lens unit comprises:
   a voltage depression circuit configured to depress a voltage supplied to the imaging device based on the output voltage.

4. The imaging apparatus according to claim 1, wherein the imaging pickup unit comprises:
   a detector configured to detect a type of the lens unit.

5. The imaging apparatus according to claim 4, wherein the detector is configured to detect the type of the imaging device.

6. The imaging apparatus according to claim 5, wherein the imaging pickup unit comprises:
   a voltage changer configured to change a value of the output voltage corresponding to the type of lens unit, or the type of the imaging device and a driving frequency of the imaging device.

7. The imaging apparatus according to claim 6, wherein the imaging pickup unit comprises:
   an image display; and
   a display changer configured to change a display of a battery remaining amount based on the type of lens unit.

8. The imaging apparatus according to claim 6, wherein the imaging pickup unit comprises:
   a locking status detector configured to detect a locking status with the lens unit,
   wherein, when the detector detects that the imaging pickup unit is not connected to the lens unit, the image display indicates an alert and the electric power supply part is stopped after the image display indicates the alert.

9. An imaging pickup unit connectable to a lens unit, comprising:
   an electric power supply part;
   a connection part connecting the lens unit to the imaging pickup unit mechanically and electrically;
   a plurality of voltage supply lines configured to supply corresponding output voltages to the lens unit;
   a plurality of digital-to-analog converters configured to supply a corresponding plurality of reference voltages to a voltage generating circuit, the reference voltages being modifiable to match power supply requirements of any of multiple imaging devices connectable to the imaging pickup unit; and
   the voltage generating circuit configured to generate the corresponding output voltages supplied to the voltage supply lines based on the plurality of reference voltages, wherein the output voltage is variable based on a type of the lens unit.

10. The imaging pickup unit according to claim 9, wherein the voltage generating circuit comprises:
    a switching circuit connecting end terminals of the second connection part and a first line of the voltage supply lines by switching between the first line and another line of the voltage supply lines.

11. The imaging pickup unit according to claim 10, further comprising:
    a detector configured to detect a type of the lens unit.

12. The imaging pickup unit according to claim 11, wherein the detector is configured to detect the type of the imaging device.

13. The imaging pickup unit according to claim 12, further comprising:
a voltage changer configured to change a value of the output voltage corresponding to the type of lens unit, or the type of the imaging device and a driving frequency of the imaging device.

14. The imaging pickup unit according to claim 13, further comprising:
an image display; and
a display changer configured to change a display of a battery remaining amount based on the type of lens unit.

15. The imaging pickup unit according to claim 13, further comprising:
a locking status detector configured to detect a locking status with the lens unit, wherein, when the detector detects that the imaging pickup unit is not connected to the lens unit, the image display indicates an alert and the electric power supply part is stopped after the image display indicates the alert.

16. A lens unit connectable to an imaging pickup unit, comprising:
an optical system configured to project a subject image onto an imaging device;
the imaging device configured to convert the subject image into an electric signal;
an imaging device driving part configured to drive the imaging device;
a signal processing device configured to convert the electric signal from the imaging device into a digital signal;
a voltage generating circuit configured to generate a voltage supplied to the imaging device based on an output voltage supplied by the imaging pickup unit, wherein the image pickup unit includes a plurality of digital-to-analog converters configured to supply a corresponding plurality of reference voltages to a voltage generating circuit, the reference voltages being modifiable to match power supply requirements of any of multiple imaging devices connectable to the imaging pickup unit; and
a connection part configured to connect the imaging pickup unit to or disconnect the lens unit from the lens unit mechanically and electrically.

17. An imaging apparatus, comprising:
a lens unit including
an optical system configured to project a subject image onto an imaging device;
the imaging device configured to convert the subject image into an electric signal;
an imaging device driving part configured to drive the imaging device;
a signal processing device configured to convert the electric signal from the imaging device into a digital signal;
a first connection part configured to connect the lens unit to or disconnect the lens unit from an imaging pickup unit mechanically and electrically; and
a voltage generating circuit configured to generate the output voltage supplied to the imaging device based on an output voltage supplied by the imaging pickup unit; and
the imaging pickup unit including
an electric power supply part;
a second connection part configured to connect the lens unit to or disconnect the lens unit from the imaging pickup unit mechanically and electrically; and
a plurality of digital-to-analog converters configured to supply a corresponding plurality of reference voltages to a voltage generating circuit, the reference voltages being modifiable to match power supply requirements of any of multiple imaging devices connectable to the imaging pickup unit.

18. A method of using an imaging pickup unit having a plurality of voltage supply lines that supply output voltage for use by a lens unit, wherein the imaging pickup unit includes a connection part configured to attach the image pickup unit mechanically and electrically to a plurality of different lens units, comprising:
connecting a first lens unit to the imaging pickup unit using the connection part of the imaging pickup unit and a corresponding connection part of the first lens unit, wherein the step of connecting the first lens unit includes connecting a first subset of the plurality of voltage supply lines to corresponding voltage input lines of the first lens unit;
communicating between the first lens unit and the imaging pickup unit;
disconnecting the first lens unit from the imaging pickup unit;
connecting a second lens unit to the imaging pickup unit using the connection part of the imaging pickup unit and a corresponding connection part of the second lens unit, wherein the step of connecting the second lens unit includes connecting a second subset of the plurality of voltage supply lines to corresponding voltage input lines of the second lens unit, wherein the second subset of voltage supply lines is a different subset from the first subset of voltage supply lines; and
communicating between the second lens unit and the imaging pickup unit.

* * * * *